UNITED STATES PATENT OFFICE.

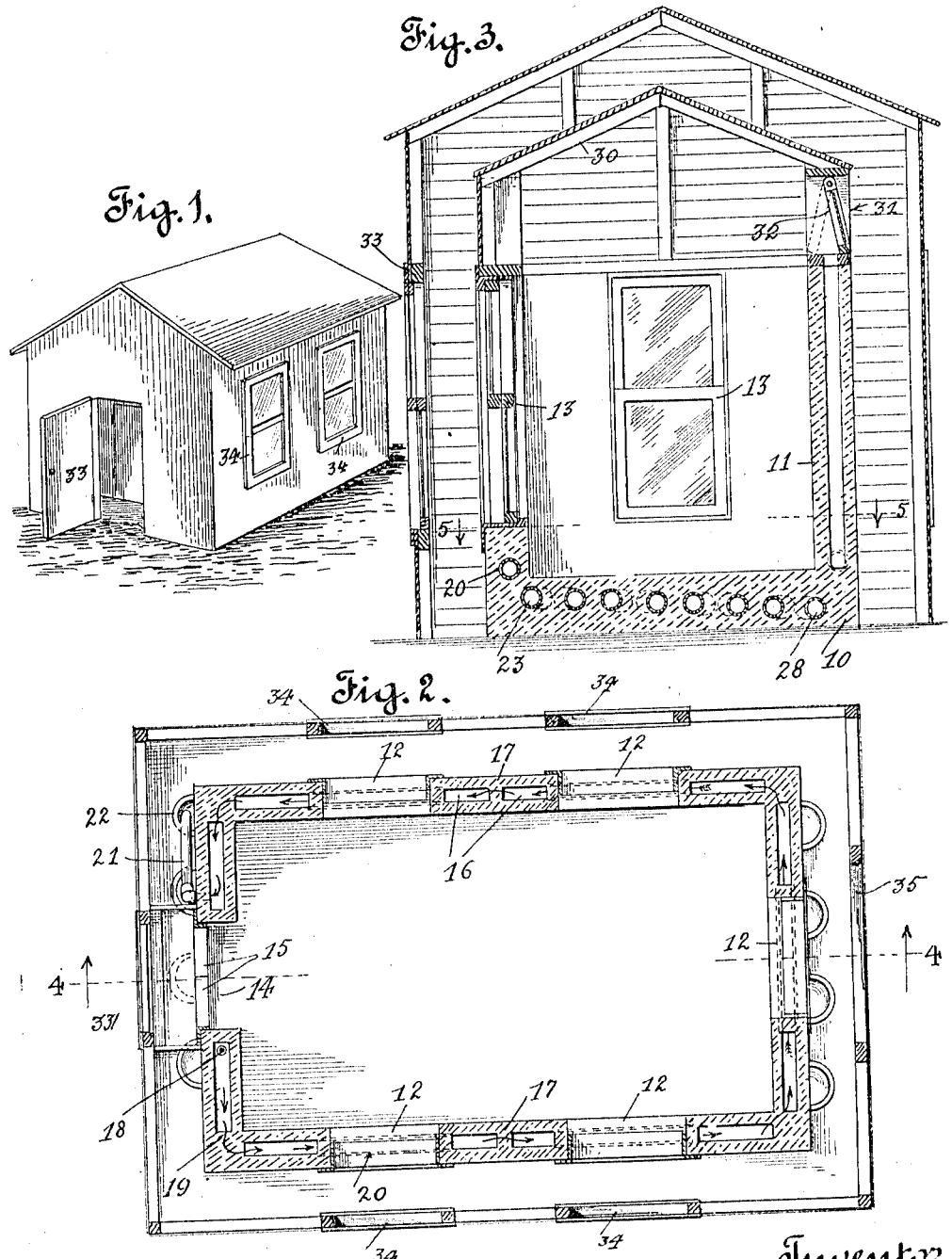

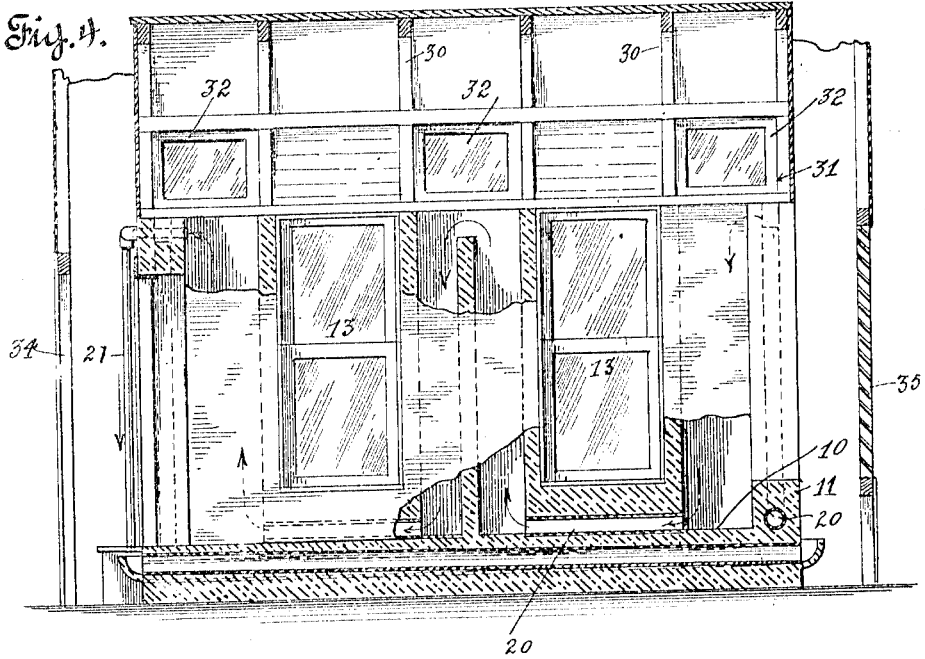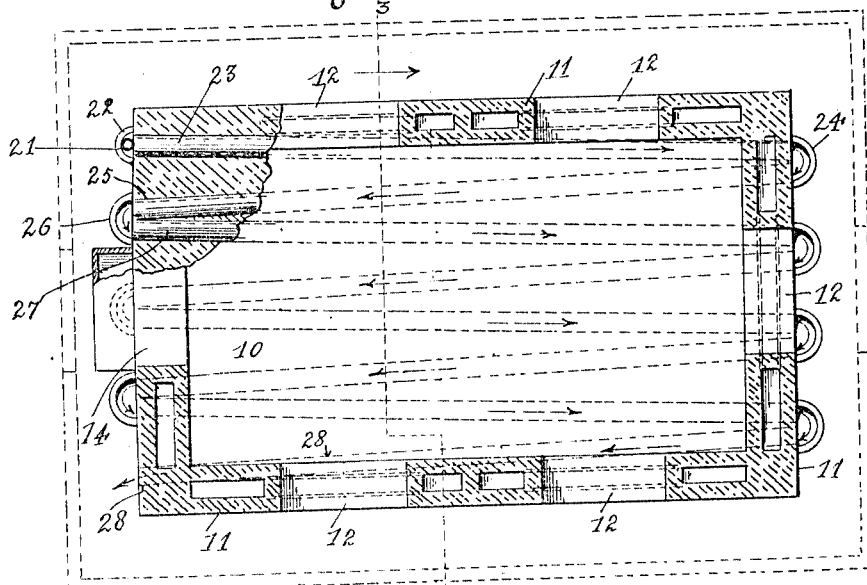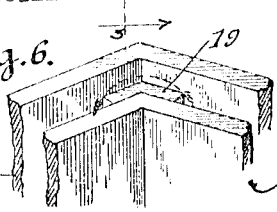

NELSON F. ANDERSON, OF LOS ANGELES, CALIFORNIA.

MEANS FOR COOLING THE INTERIOR OF REFRIGERATING STRUCTURES.

1,001,574.     Specification of Letters Patent.     Patented Aug. 22, 1911.

Application filed September 8, 1909. Serial No. 516,723.

*To all whom it may concern:*

Be it known that I, NELSON F. ANDERSON, a citizen of the United States, residing at Los Angeles, in the county of Los Angeles and State of California, have invented new and useful Improvements in Means for Cooling the Interior of Refrigerating Structures, of which the following is a specification.

My invention relates to a novel refrigerating structure that utilizes a fluid circulating medium for maintaining the temperature of the air within the structure below the temperature of the outside air, and it is one of the objects of my invention to provide a structure, whereby the temperature therein may be lowered without the use of ice or other artificial refrigerants.

A further object is to provide a novel refrigerating structure that is simple in construction, highly efficient in operation, and one in which a circulation of air may be maintained in the refrigerating chamber to prevent humidity therein.

In the accomplishment of the above objects I preferably employ a concrete construction, reinforced if desired, the walls and floor being provided with a plurality of connected chambers designed to promote a rapid and constant liquid circulation therethrough. The walls of the structure are provided with a suitable ventilating means, and the structure is also provided with a roof having means attached thereto, whereby the evaporation of the liquid flowing through the chambers formed in the walls and floor may be readily controlled. The whole concrete structure is inclosed by an outside wooden structure also provided with a ventilating means, a heat insulating space being formed by the walls of the two structures. This insulating space may be filled with a suitable insulating material in the winter months when the temperature is exceedingly low, so as to maintain the temperature within the concrete structure higher than that outside.

In the attached drawings forming a part of this specification:—

Figure 1— is a perspective view of my complete structure. Fig. 2— is a sectional plan view of the structure. Fig. 3— is a vertical cross-section of the structure taken on line 3—3 of Fig. 5. Fig. 4— is a vertical longitudinal section taken on line 4—4 of Fig. 2, parts being broken away for clarity of illustration. Fig. 5— is a sectional plan taken on line 5—5 of Fig. 3, portions of the floor being broken away to show the circulation chambers arranged therein. Fig. 6— is a perspective detail of a corner of the inner refrigerating structure.

Referring more specifically to the drawings 10 designates a floor formed of concrete or other suitable material provided with a plurality of connected liquid circulating chambers which will be more particularly described hereinafter. Formed integrally with this floor and around the outer edges thereof are vertically disposed concrete walls 11 provided with a plurality of window openings 12 having sliding sashes 13 mounted therein, and an opening 14 provided with double doors 15. These walls are provided with a plurality of vertically extending rectangular compartments or liquid ducts 16, separated one from another by means of vertically extending webs or baffles 17, as clearly shown in the various views of the drawings. The liquid circulating compartments are open at the top as shown in Figs. 3 and 4 of the drawings so that they may be readily cleansed when desired and also to permit the evaporation of the water flowing therethrough. The liquid circulation through these compartments or chambers is vertical, being from the bottom of one chamber upwardly and over the partitions 17 and thence downwardly until the liquid has traversed all the chambers formed in all the walls. The water enters at the bottom of one of the chambers or recesses formed in the front wall of the structure adjacent the door way 14, through a pipe 18, which is connected to a source of water supply (not shown). When the water completely fills this chamber, it flows over corner partition 19 into the next chamber downwardly, passing through a transversely disposed pipe or conduit 20 beneath one of the windows, thence flowing upwardly into the next chamber and so on around in the same manner until it has completely traversed all the chambers in the walls, finally discharging through an outlet pipe 21 that extends downwardly and discharges into a catch trap or basin 22. This catch trap connects to a cylindrical circulating chamber or duct 23 disposed in the floor of the concrete structure extending longitudinally thereof to the opposite end with a slight fall to insure a rapid circulating of the water to a similar catch trap 24 which connects to a similar conduit 25 that extends toward the front end of the chamber and empties into a catch basin 26. The conduit 25 has approximately the same fall as conduit 23 from the rear to the front end of the structure and it empties into trap 26 that is connected to another conduit 27 which returns the water to the rear end of the structure into similar traps located at the rear thereof, continuing in this manner until it finally reaches conduit 28 from which it is discharged to a tank (not shown).

By the above described means it will be observed that a constant liquid circulation will be set up within the walls and floor of the concrete structure, thereby completely cooling the air within the structure. It will also be observed that by circulating the liquid through the various chambers in the walls and through the conduits in the floor that the liquid will not absorb or retain the radiated heat of the outside atmosphere.

The roof of the concrete structure is preferably formed from wood or similar material, the vertically disposed side and end walls being formed of studding and sealed on the outside thereof by planking. The roof proper consists of the usual rafters 30 attached to the vertically disposed side walls into the form of an ordinary gable roof. The vertically disposed side walls of the roof construction are provided with a plurality of ventilating openings 31 each closed by a pivoted glass frame 32, the openings being disposed at each side of the window openings in the concrete structure as clearly shown in Fig. 4 of the drawings. These pivoted frames are adapted to be swung from one side to the other of the recessed chambers as shown in Fig. 3 of the drawings to prevent the atmosphere within the chamber from becoming excessively humid.

The entire concrete structure or inner house is preferably inclosed within a wooden structure or outer house, the space between the walls insulating the concrete structure from the outside atmosphere. This structure is provided at the front thereof with a door 33 and the side walls are provided with window frames 34. The rear wall of the structure is preferably provided with a latticed or louver boarded opening 35 as shown in Fig. 4 of the drawings.

In excessively cold weather when it is desired to maintain the temperature within the concrete structure higher than the outside temperature, the space between the walls of the two structures may be filled with an insulating material, such as sawdust, mineral wool or like materials.

In operation water is admitted through pipe 18 until all the chambers or water compartments are filled, the water passing out through conduit 28 in the floor of the concrete structure, the amount of water which enters the liquid chambers being slightly greater than the amount that is discharged, will maintain a constant liquid circulation throughout the chambers and conduits. When the temperature within the concrete structure becomes too humid from rapid evaporation of the water passing through the liquid chambers, the pivoted window frames may be swung to the inside as illustrated in dotted lines of Fig. 3, thus quickly reducing the humidity within the chamber. By means of the windows in both structures the circulation of air within the concrete chamber and around the same may be quickly and efficiently controlled.

It will be observed from the foregoing description that I have provided a novel refrigerating structure that may be erected in localities where ice is unobtainable, and which will maintain the temperature within the structure sufficiently cool so as to enable me to keep perishable articles in a complete state of preservation for the maximum length of time.

Attention is called to the fact that the inner structure or house is of a conductive material, while the outer house is of a non conductive material. This is an advantage because it facilitates the insulation of the inner house by a packing placed in the space between the walls.

On account of the fact that the ends of the ducts 23 are open enables these pipes to be readily cleaned of slimy and earthy matter which may be carried in the water, and this can be done without necessitating the disconnection of any piping whatever, furthermore, this arrangement is conducive to the flow of air through the ducts which materially increases the rate of evaporation. This is desirable as it tends to reduce the temperature.

What I claim is:—

1. A refrigerating structure, comprising a plurality of inclosing hollow walls forming a refrigerating chamber, said walls being provided with webs forming a plurality of liquid circulation compartments connected one with the other, a floor for said chamber, said floor being provided with a plurality of liquid circulation ducts therein open at their ends, and open basins connecting said ducts.

2. A refrigerating house having a floor of heat conductive material and having a plurality of longitudinally disposed ducts formed therein, said ducts being open on the ends of said house, open basins formed on the end walls of said house adjacent to the ends of said ducts and connecting said
5 ducts, said ducts being arranged at graduated elevations, and means for supplying a refrigerating liquid to said ducts.

In witness that I claim the foregoing I have hereunto subscribed my name this 1st day of September, 1909.

NELSON F. ANDERSON.

Witnesses:
EDMUND A. STRAUSE,
ETHEL COLEMAN.